United States Patent
Garimella et al.

(10) Patent No.: US 9,464,823 B2
(45) Date of Patent: Oct. 11, 2016

(54) VAPOR-LIQUID HEAT AND/OR MASS EXCHANGE DEVICE

(75) Inventors: Srinivas Garimella, Smyrna, GA (US); Jared Carpenter Delahanty, Atlanta, GA (US); Ananda Krishna Nagavarapu, Atlanta, GA (US)

(73) Assignee: GEORGIA TECH RESEARCH CORPORATION, Atlanta, GA (US)

( * ) Notice: Subject to any disclaimer, the term of this patent is extended or adjusted under 35 U.S.C. 154(b) by 463 days.

(21) Appl. No.: 13/814,792

(22) PCT Filed: Aug. 10, 2011

(86) PCT No.: PCT/US2011/047304
§ 371 (c)(1),
(2), (4) Date: Feb. 7, 2013

(87) PCT Pub. No.: WO2012/021658
PCT Pub. Date: Feb. 16, 2012

(65) Prior Publication Data
US 2013/0133346 A1    May 30, 2013

Related U.S. Application Data

(60) Provisional application No. 61/372,213, filed on Aug. 10, 2010.

(51) Int. Cl.
*F25B 15/00* (2006.01)
*F25B 15/16* (2006.01)
(Continued)

(52) U.S. Cl.
CPC .............. *F25B 15/00* (2013.01); *F25B 15/02* (2013.01); *F25B 15/16* (2013.01); *F25B 17/00* (2013.01);
(Continued)

(58) Field of Classification Search
CPC ........ F25B 15/16; F25B 15/00; F25B 17/00; F25B 17/02; F25B 30/04; F25B 39/026; F25B 43/046; F25B 2315/006; F25B 35/02; F25B 35/00; F28F 3/12
USPC ......................................... 62/101, 109, 487
See application file for complete search history.

(56) References Cited

U.S. PATENT DOCUMENTS 3,641,784 A * 2/1972 Schlichtig ........................ 62/476
4,477,369 A * 10/1984 Sugimori et al. .......... 252/299.6
(Continued)

FOREIGN PATENT DOCUMENTS

CN    101132853 A    2/2008
JP     04080570 A    3/1992
(Continued)

OTHER PUBLICATIONS

International Search Report and Written Opinion dated May 29, 2013 for related PCT Patent Application No. PCT/US2011/047304.
(Continued)

*Primary Examiner* — Marc Norman
*Assistant Examiner* — David Teitelbaum
(74) *Attorney, Agent, or Firm* — Troutman Sanders LLP; Ryan A. Schneider; Daniel T. Sharpe (57) ABSTRACT

The invention is directed toward a vapor-liquid heat and/or mass exchange device that can be used in an integrated heat and/or mass transfer system. To achieve high heat and mass transfer rates, optimal temperature profiles, size reduction and performance increases, appropriately sized flow passages with microscale features, and countercurrent flow configurations between working fluid solution, vapor stream, and/or the coupling fluid in one or more functional sections of the desorber are implemented. In one exemplary embodiment of the present invention, a desorber section utilizes a heating fluid flowing in a generally upward direction and a concentrated solution flowing in a generally downward direction with gravity countercurrent to the rising desorbed vapor stream. To further increase the efficiency of the system, various types of column configurations can be used. Additionally, the surfaces of the microchannels can be altered to better transfer heat.

18 Claims, 8 Drawing Sheets

(51) Int. Cl.
    *F25B 17/00*     (2006.01)
    *F25B 17/02*     (2006.01)
    *F25B 30/04*     (2006.01)
    *F25B 39/02*     (2006.01)
    *F25B 43/04*     (2006.01)
    *F25B 15/02*     (2006.01)
    *F25B 37/00*     (2006.01)
    *F28D 9/00*     (2006.01)
    *F28D 21/00*     (2006.01)
    *F28C 3/06*     (2006.01)
    *F25B 35/02*     (2006.01)
    *F25B 35/00*     (2006.01)
    *F28F 3/12*     (2006.01)

(52) U.S. Cl.
    CPC ............... *F25B 17/02* (2013.01); *F25B 30/04* (2013.01); *F25B 37/00* (2013.01); *F25B 39/026* (2013.01); *F25B 43/046* (2013.01); *F28C 3/06* (2013.01); *F28D 9/00* (2013.01); *F28D 21/0015* (2013.01); *F25B 35/00* (2013.01); *F25B 35/02* (2013.01); *F25B 2315/006* (2013.01); *F28F 3/12* (2013.01)

(56) References Cited

U.S. PATENT DOCUMENTS

| | | | | |
|---|---|---|---|---|
| 5,857,355 | A * | 1/1999 | Hwang | 62/476 |
| 5,942,164 | A * | 8/1999 | Tran | 261/128 |
| 6,705,111 | B1 * | 3/2004 | Rockenfeller et al. | 62/476 |
| 6,827,128 | B2 * | 12/2004 | Philpott et al. | 165/46 |
| 2005/0200001 | A1 * | 9/2005 | Joshi et al. | 257/712 |
| 2007/0017633 | A1 | 1/2007 | Tonkovich et al. | |
| 2009/0255290 | A1 | 10/2009 | Tegrotenhuis et al. | |

FOREIGN PATENT DOCUMENTS

| | | | |
|---|---|---|---|
| JP | 10062033 A | 3/1998 | |
| JP | H10513540 A | 12/1998 | |
| WO | 9964147 A2 | 12/1999 | |
| WO | WO2008/029185 * | 3/2008 | ............. F25B 35/04 |
| WO | 2010014878 | 2/2010 | |
| WO | 2010014878 A1 | 2/2010 | |

OTHER PUBLICATIONS

Office Action in related Chinese Patent Application No. 201180038928.3, mailed Aug. 8, 2014.

Supplemental European Search Report in related EP Application No. 11817010.9, mailed Dec. 17, 2014.

Office Action in related Japanese Patent Application No. 2013-524219, mailed Nov. 12, 2014.

Office Action in related Japanese Patent Application No. JP2013-524219, mailed Jul. 17, 2015.

* cited by examiner

VAPOR-LIQUID HEAT AND/OR MASS EXCHANGE DEVICE

CROSS-REFERENCE TO RELATED APPLICATIONS

This application claims the benefit of International Patent Application Serial No. PCT/US2011/047304, filed 10 Aug. 2011, and entitled "Vapor-Liquid Heat and/or Mass Exchange Device", which claims the benefit under 35 U.S.C. §119(e) of U.S. Provisional Patent Application No. 61/372,213, filed 10 Aug. 2010, and entitled "Vapor-Liquid Heat and/or Mass Exchange Device", both of which are incorporated by reference as if set forth herein in their entirety.

TECHNICAL FIELD

The present system relates generally to heat and/or mass exchange devices.

BACKGROUND

An absorption heat pump is an environmentally benign replacement for vapor-compression systems using synthetic refrigerants that are typically employed in residential and commercial air-conditioners, chillers and heat pumps. Unlike vapor-compression systems that utilize high-grade electrical or mechanical energy as the input that drives the system, absorption heat pumps run on more readily available and low-grade thermal energy, which can be obtained from combustion of bio-fuels and fossil fuels, from largely untapped waste heat sources, and from solar thermal energy. For example, the heat from the exhaust of a truck or a diesel generator can be used as a heat input.

In a cooling mode operation, the heat input is used to provide cooling and/or dehumidification, while in heating mode operation, the heat input is used to pump ambient heat to higher temperatures. Since in principle the compressor of a vapor-compression system is replaced in an absorption heat pump by the combination of a desorber, an absorber, a liquid solution pump, and a recuperative solution heat exchanger, these absorption heat pumps are more heat and mass exchange intensive, requiring additional transfer surface area and/or heat and mass transfer capacity. Because of the comparatively larger heat and mass transfer rate requirements, absorption heat pumps typically have been associated with large scale commercial and industrial chiller applications.

Achieving compact designs with small footprints while delivering high coefficients of performance (COPs) has been a major challenge thus far. COP can be defined as the ratio of the desired output, cooling or heating, to the input energy. Several advanced absorption cycles such as the double-effect, triple-effect, and Generator-Absorber Heat Exchange cycles, while developed to improve COPs, rely on additional internal recuperation to improve performance, further emphasizing the need for high heat and mass transfer rates per volume. In conventional systems, these cycles have not been widely implemented, especially in small capacity or compact systems, primarily because of the lack of practically feasible and compact heat and mass exchange devices.

In conventional absorption systems that use the two common working fluid pairs, Lithium Bromide-Water and Ammonia-Water, in binary fluid processes, such as absorption and desorption, involve coupled heat and mass transfer in binary fluids. With other less common working fluids, multi-component (more than two species) heat and mass transfer processes are required. In ammonia-water systems, due to the presence of both absorbent (water) and refrigerant (ammonia) in both the liquid and vapor phases throughout the system, including in the condenser, evaporator, rectifier, and recuperative heat exchangers, such binary fluid processes can occur in all components in the system.

For the implementation of absorption systems in compact, high-flux configurations that can take advantage of disperse availability of waste heat or solar thermal energy in smaller capacities than at the industrial scales, the heat and mass exchanger designs usually incorporate several features. These can include low heat and mass transfer resistances for the working fluids, the necessary transfer surface area for the working fluids and the fluids that couple them to external heat sources and sinks in compact volumes, low resistances of the coupling fluids, low working fluid and coupling fluid pressure drop to reduce parasitic power consumption and also losses in driving temperature differences due to decrease in saturation temperatures brought about by pressure drops in components, and even distribution of the working fluid or coupling fluid throughout the component. Typical conventional absorption component concepts fall short in one or more of these criteria important for achieving compact, high-flux designs.

BRIEF SUMMARY OF THE DISCLOSURE

Briefly described, an exemplary embodiment of the present invention is a vapor-liquid heat and/or mass transfer device that facilitates heat and/or mass transfer between vapor and liquid streams in relatively compact envelopes. In order to achieve a desired amount of mass/heat exchange in processes including, for example, desorption or absorption for a given component volume, in accordance with an embodiment of the present invention, a countercurrent flow arrangement is provided in which a coupling fluid flows in a countercurrent direction to a working fluid solution. In some examples, the working fluid solution is a binary fluid comprised of ammonia absorbed in water. Depending on whether the coupling fluid serves a heating or a cooling function, it increases or decreases the temperature of the working fluids solution, causing the ammonia to desorb from the water solution, or to be absorbed into the solution.

These desorption and absorption processes are two representative examples of counterflow phase-change heat and mass transfer processes in binary or multi-component fluids that can be accomplished by such embodiments. In an exemplary embodiment of the present invention, the present invention is a desorber formed by matched shims that form microchannels or other vapor-liquid cavities when joined. A pair of matched shims, herein sometimes referred to as a unit, can be paired with other matched shims, or units, to increase the desorption capabilities of the desorber, thus allowing the component to be scaled to match various applications without significant redesign or re-tooling.

In one exemplary embodiment of the present invention, an exchange device for use in an integrated heat and mass transfer apparatus comprises a transfer section formed by a first unit of matched and joined shims, the transfer section having at least one heat exchange region defined by a plurality of rows of compact flow passages formed by the matched and joined shims of the first unit, wherein the plurality of rows of flow passages provide for a countercurrent flow pattern between a coupling fluid and a working fluid solution when the coupling fluid and the working fluid solution are introduced into the exchange device, wherein the exchange device is oriented such that the coupling fluid travels in a generally upward direction and the working fluid solution travels in a generally downward direction with gravitational assistance, and wherein the countercurrent flow pattern creates a relationship between a vapor and the working fluid solution.

In one exemplary embodiment of the present invention, a vapor/liquid heat and/or mass exchange device for use in an integrated heat and mass transfer apparatus comprises a heat and/or mass transfer section formed by a first unit of matched and joined shims, the heat or mass transfer section having at least one heat exchange region defined by a plurality of rows of compact flow passages formed by the matched and joined shims of the first unit, and, wherein the plurality of rows of flow passages create a countercurrent flow pattern between a coupling fluid and a working fluid solution, whereby the coupling fluid travels in a generally upward direction and the working fluid solution travels in a generally downward direction with gravitational assistance to desorb a vapor from or absorb a vapor into at least a portion of the working fluid solution.

In another exemplary embodiment of the present invention, a desorber assembly can be used in an integrated apparatus accomplishing multiple related heat and mass transfer processes. The desorber assembly comprises of a desorber section formed by a first unit of matched and joined shims. The desorber assembly of the present embodiment comprises at least one heat exchange region defined by a plurality of rows of microchannels formed by the matched and joined shims of the unit. To provide for heat exchange, the plurality of rows of microchannels are configured to create a countercurrent flow pattern between a coupling (in this case, heating) fluid and a working fluid (in this case, a concentrated solution) whereby the heating fluid travels in a generally upward direction and the concentrated solution travels in a generally downward direction with gravitational assistance to desorb a vapor, which in turn flows upward aided by buoyancy, and therefore in a countercurrent orientation to the concentrated solution, from at least a portion of the concentrated solution.

In another exemplary embodiment of the present invention, a desorber comprises a top end plate with ports that introduce a heating fluid and a concentrated solution into the desorber, and the heating fluid, the concentrated solution, and a vapor out of the desorber, a distribution plate that distributes the heating fluid and the concentrated solution into the desorber assembly, and the heating fluid, concentrated solution and the vapor out of the desorber assembly, a desorber section formed by a first unit of matched and joined shims, the desorber section having at least one heat exchange region defined by a plurality of rows of microchannels formed by the matched and joined shims of the unit, wherein the plurality of rows of microchannels create a countercurrent flow pattern between the heating fluid and the concentrated solution, whereby the heating fluid travels in a generally upward direction and the concentrated solution travels in a generally downward direction with gravitational assistance to desorb a vapor, which in turn flows upward aided by buoyancy, and therefore in a countercurrent orientation to the concentrated solution, from at least a portion of the concentrated solution, and a bottom endplate that provides a fluid barrier.

In another exemplary embodiment of the present invention, a method of heat and/or mass exchange comprises inputting a coupling fluid into a transfer section formed by a first unit of matched and joined shims, the transfer section having at least one heat exchange region defined by a plurality of rows of flow passages formed by the matched and joined shims of the first unit, providing for a plurality of rows of flow passages that facilitate a countercurrent flow pattern relationship between the coupling fluid a working fluid solution, inputting the working fluid solution into the transfer section, wherein the plurality of rows of flow passages facilitate the countercurrent flow pattern between the coupling fluid and the working fluid solution, and transferring a component in the transfer section.

In some embodiments of the present invention, the concentrated solution comprises ammonia and water.

In some embodiments of the present invention, to increase the heat and/or mass exchange capability of the desorber, the desorber section is further formed by a plurality of second units of matched and joined shims.

In some embodiments of the present invention, a rectifier section is provided to purify the vapor coming from a desorber or analyzer section.

In some embodiments of the present invention, an analyzer section is provided for recuperative heat and/or mass exchange between the concentrated solution and the vapor to preheat the concentrated solution prior to being introduced into the desorber section, and to favorably alter the vapor concentration through direct contact heat and mass exchange with the solution.

In some embodiments of the present invention, the fluid passages within one side of the exchanger comprise geometries selected from the group consisting of: vertical oriented columns, diagonally oriented columns; serpentine-type channels; and alternating diagonally oriented columns.

In some embodiments of the present invention, the fluid passages further comprise one or more of columns with trays, columns with pools, columns with fin arrays, and columns with packing.

In some embodiments of the present invention, a portion of an inner surface of a fluid passage can be altered to have a variety of surface modification structures that provide improved flow distribution and/or heat and mass transfer, including, but not limited to: a dimpled surface; a surface having elevated points; a hatched surface; a cross-hatched surface; and roughened surface.

In some embodiments of the present invention, the coupling fluid comprises fluid heated by heat sources selected from the group consisting of: combustion of bio-fuels and fossil fuels; waste heat sources; and solar thermal energy.

Embodiments of the present invention can also comprise an exchange device for use in an integrated heat and mass transfer apparatus. The device can comprise a transfer section formed by a first unit of matched and joined shims. The transfer section can have at least one heat exchange region defined by a plurality of rows of compact flow passages formed by the matched and joined shims of the first unit. In some embodiments, the plurality of rows of flow passages can provide for a countercurrent flow pattern between a coupling fluid and a working fluid solution when the coupling fluid and the working fluid solution are introduced into the exchange device. In some embodiments, the exchange device can be oriented such that the coupling fluid travels in a generally upward direction and the working fluid solution travels in a generally downward direction with gravitational assistance. Moreover, the countercurrent flow pattern can create a relationship between a vapor and the working fluid solution.

In some embodiments, the device is a heat exchanger, mass exchange device, or combined heat and mass exchange device.

In some embodiments, the relationship can be one of transfer being desorption from the working fluid solution and absorption into the working fluid solution.

In some embodiments, the transfer between the working fluid solution and the counterflow vapor is achieved through geometry specifications of the passages formed by the shims without leading to flooding or flow reversal of the working fluid solution by the vapor desorbed from or absorbed into the working fluid solution.

In some embodiments, the working fluid solution comprises ammonia and water.

In some embodiments, the transfer section is further formed by a plurality of second units of matched and joined shims.

In some embodiments, the transfer section provides for parallel flow between at least two of the plurality of units.

In some embodiments, the transfer section provides for serial flow between at least one of the plurality of second units.

In some embodiments, the transfer section is an absorption section.

In some embodiments, the heat and/or mass transfer section is a desorber section.

In some embodiments, the exchange device further comprises a rectifier section that purifies the vapor.

In some embodiments, the temperature of at least a portion of the vapor is reduced through heat exchange with a coolant.

In some embodiments, the coolant comprises one of a hydronic coupling fluid or concentrated ammonia-water solution.

In some embodiments, the exchange device further comprises an analyzer section for recuperative exchange between the working fluid solution and the vapor to preheat the working fluid solution prior to introduction into the desorber section to partially purify the vapor.

In some embodiments, the plurality of rows of microchannels comprise geometries selected from the group consisting of: vertical oriented columns; diagonally oriented columns; serpentine-type channels; and alternating diagonally oriented columns.

In some embodiments, the plurality of rows of microchannels further comprise one or more of columns with trays, columns with pools, fin arrays, and packing.

In some embodiments, at least a portion of an inner surface of at least one of the plurality of rows of microchannels is selected from the group consisting of: a dimpled surface; a surface having elevated points; a hatched surface; a cross-hatched surface; a patterned surface; and roughened surface.

In some embodiments, the coupling fluid comprises fluid heated by sources derived from the group consisting of: combustion of bio-fuels and fossil fuels; waste heat sources; and solar thermal energy.

Embodiments of the present invention can also comprise a desorber for use in an integrated heat and mass transfer apparatus. The desorber can comprise a top end plate with a plurality of ports for inputting a heating fluid and a concentrated solution into the desorber. The top end plate can be configured to output the heating fluid, the concentrated solution, and a vapor out of the desorber. The desorber can further comprise a distribution plate for distributing the heating fluid and the concentrated solution into the desorber assembly and distributing the heating fluid, concentrated solution and the vapor out of the desorber assembly. The desorber can also comprise a desorber section formed by a first unit of matched and joined shims. The desorber section can have at least one heat exchange region defined by a plurality of rows of flow passages with microscale features formed by the matched and joined shims of the first unit. In some embodiments, the plurality of rows of flow passages with microscale features can provide for a countercurrent flow pattern between the heating fluid and the concentrated solution. In some embodiments, the desorber can be oriented such that the heating fluid travels in a generally upward direction and the concentrated solution travels in a generally downward direction with gravitational assistance. In some embodiments, the countercurrent flow pattern can create a relationship between a vapor and the concentrated solution to desorb the vapor from at least a portion of the concentrated solution. The desorber can further comprise a bottom endplate that provides a fluid barrier.

In some embodiments, the concentrated solution comprises ammonia and water.

In some embodiments, the desorber section is further formed by a plurality of second units of matched and joined shims.

In some embodiments, the desorber further comprises a rectifier section that purifies the vapor through heat exchange with a coolant to reduce the temperature of at least a portion of the vapor.

In some embodiments, the coolant is a hydronic coupling fluid or concentrated ammonia-water solution.

In some embodiments, the desorber further comprises an analyzer section for recuperative heat and mass exchange between the concentrated solution and the vapor to preheat the concentrated solution prior to introduction into the desorber section to partially purify the vapor prior.

In some embodiments, the plurality of rows of flow passages with microscale features comprise geometries selected from the group consisting of: vertical oriented columns; diagonally oriented columns; serpentine-type channels; and alternating diagonally oriented columns.

In some embodiments, the plurality of rows of flow passages with microscale features further comprise one or more of columns with trays, columns with pools, fin arrays, and packing.

In some embodiments, at least a portion of an inner surface of at least one of the plurality of rows of flow passages with microscale features are selected from the group consisting of: a dimpled surface; a surface having elevated points; a hatched surface; a cross-hatched surface; patterned surface; and roughened surface.

In some embodiments, the heating fluid is comprised of fluid that is heated by heat sources derived from the group consisting of: combustion of bio-fuels and fossil fuels; waste heat sources; and solar thermal energy.

Embodiments of the present invention can further comprise a method of heat and/or mass exchange. The method can comprise inputting a coupling fluid into a transfer section formed by a first unit of matched and joined shims. The transfer section can have at least one heat exchange region defined by a plurality of rows of flow passages formed by the matched and joined shims of the first unit. The method can further comprise providing for a plurality of rows of flow passages that facilitate a countercurrent flow pattern relationship between the coupling fluid a working fluid solution. The method can also comprise inputting the working fluid solution into the transfer section, wherein the plurality of rows of flow passages can facilitate the countercurrent flow pattern between the coupling fluid and the working fluid solution. The method can additionally comprise transferring a component in the transfer section.

In some embodiments, transferring a component in the transfer section comprises desorbing a vapor from at least a portion of the working fluid solution.

In some embodiments, the method further comprises rectifying the vapor.

In some embodiments, the method further comprises reducing the temperature of at least a portion of the vapor through heat exchange with a coolant.

In some embodiments, the coolant comprises one of a hydronic coupling fluid or concentrated ammonia-water solution.

In some embodiments, the method further comprises providing for recuperative heat and mass exchange between the working fluid solution and the vapor to preheat the working fluid solution.

In some embodiments, transferring a component is achieved through geometry specifications of the flow passages formed by the shims without leading to flooding or flow reversal of the working fluid solution by the vapor desorbed from the working fluid solution.

In some embodiments, transferring a component in the transfer section comprises absorbing a vapor into at least a portion of the working fluid solution.

In some embodiments, the working fluid solution comprises ammonia and water.

In some embodiments, the method further comprises joining a plurality of second units to the first unit.

The foregoing summarizes some beneficial aspects of the present invention, but is not intended to be reflective of the full scope of the present invention as claimed. Additional features and advantages of the present invention are set forth in the following description, are apparent from the description, or learned by practicing the present invention. Moreover, the foregoing summary and following detailed description are exemplary and explanatory, and are intended to provide further explanation of the present invention as claimed.

BRIEF DESCRIPTION OF THE DRAWINGS

The accompanying drawings, which are incorporated in and constitute a part of this specification, illustrate multiple exemplary embodiments of the present invention and, together with the description, serve to explain the principles of the present invention. They are not intended in any manner to limit the scope of the present invention. Headings provided herein are for convenience only and do not necessarily affect the scope or meaning of the claimed invention.

DETAILED DESCRIPTION

The subject matter of the various embodiments of the present invention is described with specificity to meet statutory requirements. However, the description itself is not intended to limit the scope of the claimed invention. Rather, it has been contemplated that the claimed invention can be embodied in other ways, to include different elements similar to the ones described in this document, in conjunction with other present or future technologies.

It should be noted that, as used in the specification and the claims, the singular forms "a," "an" and "the" include plural references unless the context clearly dictates otherwise. The terms "comprising" or "containing" or "including" mean that at least the named component, element, apparatus, or method step is present in the system or article or method, but does not exclude the presence of other components, materials, apparatus, or method steps, even if the other such components, material, particles, and method steps have the same function as what is named.

There have been recent advances in the development of compact, modular designs that can be applied to achieve high flux heat and mass transfer both in individual components and in the overall heat pump assembly, while addressing the deficiencies of current art configurations. These designs represent miniaturization technology, highly adaptable to a variety of design conditions, and also to several systems in multiple industries involved in binary-fluid heat and mass transfer.

One such component required for compact thermally-actuated heat pump technology is the desorber, where refrigerant vapor is generated by boiling the refrigerant-rich absorbent solution. In large scale industrial applications in which there is no realistic shortage of heat exchanger surface area ("real estate") available, the performance of the desorber, while important, is more easily achieved merely by increasing the size of the desorber. In more compact applications such as residential, automotive or other, where size is critical, high heat and mass transfer rate performance of the desorber is critical to meet constraints on the size. It has been found that counterflow orientations between the liquid solution and vapor flows yield cooler, higher purity refrigerant vapor at the desorber outlet. Such configurations facilitate superior mass transfer between the vapor and liquid flows and can potentially reduce the heat input required to generate a high concentration refrigerant vapor stream, which in turn can enhance the overall performance of the heat pump.

It should be noted that embodiments of the present invention can be used in various heat and/or mass transfer devices. The following description is for purposes of illustrating exemplary embodiments of the present invention as they can be used in conjunction with a desorption process. The following description is not an explicit or implicit statement that the present invention is limited to desorbers.

Figure 1:
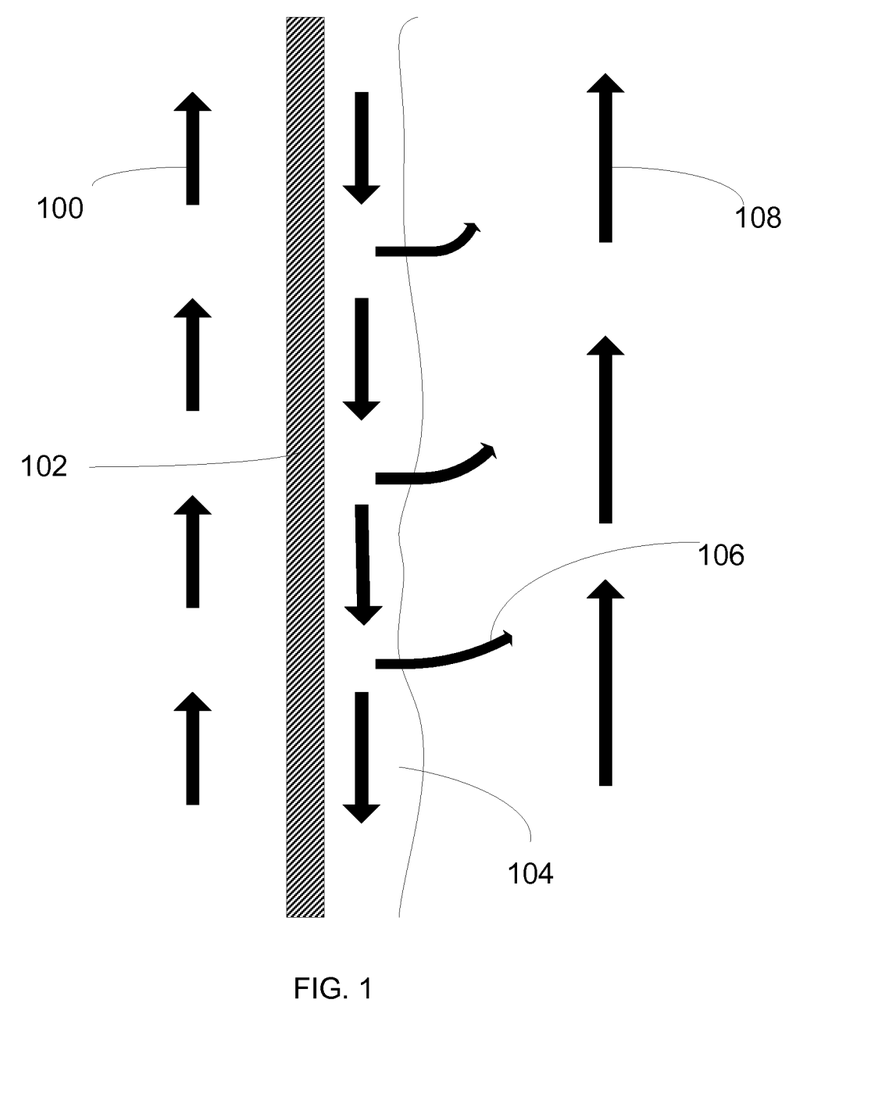
FIG. 1 is an illustration showing vapor separation in a desorber/rectifier for use in an integrated heat and/or mass exchange device in accordance with an embodiment of the present invention.

FIG. 1 is illustrative of an exemplary counterflow design for use in the present invention. Heating fluid 100 is present on one side of heat transfer barrier 102. As used in the following description, a heating fluid can also be termed a coupling fluid. Due to the manner in which heating fluid 100 is pumped into the system, heating fluid 100 travels in a generally upward direction. Heating fluid 100 can comprise various types of heating fluids heated by a variety of sources including, but not limited to, vehicular exhaust gas heat, water or steam heated from an external process, combustion heat, waste heat sources, solar thermal energy, and the like.

On the other side of barrier 102 travelling in a countercurrent direction in relation to heating fluid 100 is refrigerant-rich absorbent solution 104. As used in the following description, absorbent solution 104 can also be termed a working fluid solution. Solution 104 can vary from application to application depending on the type of refrigerant used as well as the fluid used. A common example is ammonia-water, though the present invention is not so limited, as other fluid combinations of similar functionality, such as Lithium Bromide-Water, ionic liquid-refrigerant solutions, and others, can be used in the present invention.

Solution 104 is heated via heat transfer from heating fluid 100 as solution 104 moves downward along barrier 102. Heat is transferred from heating fluid 100 through barrier 102 into solution 104. As the temperature of solution 104 increases, due to the input of heat from heating fluid 100, in an ammonia-water example, ammonia 106 desorbs from solution 104 and enters vapor stream 108. Because of the countercurrent flow pattern between heating fluid 100 and solution 104, favorable temperature differences between the two fluids are maintained throughout the desorption column, with the heat exchange occurring through the entire barrier 102 across which the two fluids are flowing in counterflow orientation. In turn, the counterflow orientation between the solution 104 and the vapor 106 provides additional advantages, namely, the vapor leaves the component at the top, in close to equilibrium conditions with solution 104 at its inlet conditions. This vapor exit at the cooler conditions near the top (instead of equilibrium with the hotter outlet solution near the bottom as would be the case in co-flow orientations) decreases desorber heat input requirements, increases vapor purity, and decreases the load on the rectifier. Thus, for a given heat and/or mass exchange surface area, the counter-current flow of the present invention provides for an increased purity of vapor stream 108, i.e. vapor stream 108 is primarily ammonia with only a minor portion being water in the present example.

Figure 2:
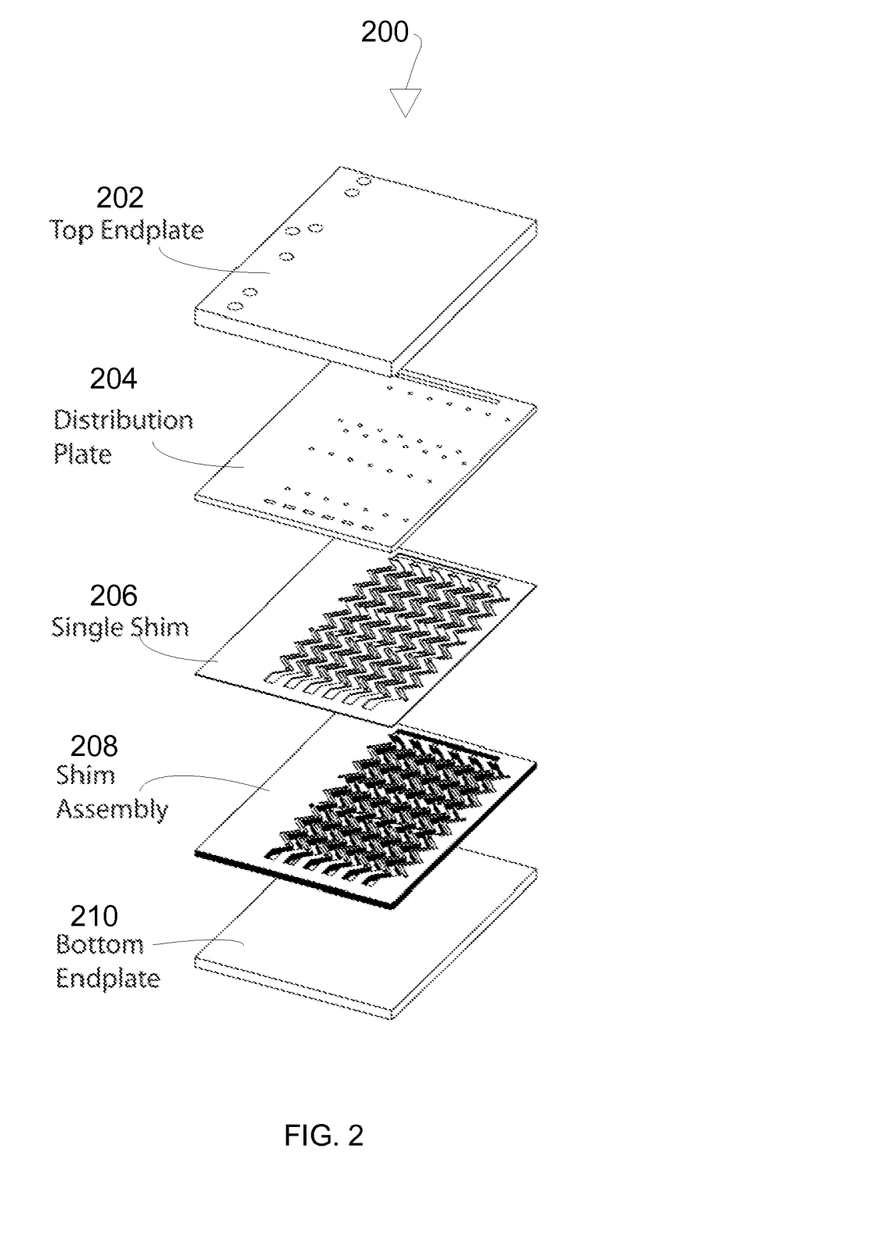
FIG. 2 is an exploded view of an exemplary desorption unit for use in an integrated heat and/or mass exchange device in accordance with an embodiment of the present invention.

Through the use of countercurrent flow, the size of an absorption or desorption unit can be reduced by reducing the surface area needed for a given purity level (i.e. heat and/or mass exchange). FIG. 2 is an illustration of a desorption assembly 200 that is designed using multiple, matching shims that form the fluid channels of the desorption assembly 200. Each shim is designed to pair with another shim to form one unit. In an exemplary basic configuration, desorption assembly 200 of the present invention can be one unit comprising two shims that form the flow channels. The unit will typically be capable of a certain or designed amount of heat and/or mass exchange capability. The number of units can be increased or decreased based on the amount of heat and/or mass exchange capability needed.

To form the units for use, the shims can be joined using various construction techniques. For example, the shims can be bonded or sealed using by way of example and not by way of limitation, heat, compression, adhesives, sealers, diffusion bonding, and vacuum or controlled atmosphere brazing. The shims can also be formed of various materials using various manufacturing processes. For example, and not by way of limitation, the shims can be cast or forged metal, plastics, polymers or composites, or can be formed using etching, forming, or CNC machining or fabrication processes. Rapid prototyping, injection molding, or casting processes can be used in which a single block of material can be formed containing all the necessary features within one part. This can help to reduce cost, manufacturing time requirements, and difficulty in bonding or sealing the multiple shims described in various embodiments of the present invention.

Shown in FIG. 2 are exemplary plates that can form desorption assembly 200. Top endplate 202 is joined with distribution plate 204. Top end plate 202 forms the primary fluid barrier between assembly 200 and the environment. Depending on the configuration, top end plate 202 can comprise various inlets and outlets for various fluids used for desorption. Distribution plate 204 facilitates the routing function for the various fluids used in assembly 200 received through top endplate 202. Although top endplate 202 can be configured to have the flow channel inlets and outlets to cooperate with distribution plate 204, in most applications, it is preferred to reduce the number of penetrations into assembly 200 exposed to the environment. This helps to reduce the probability of leaks. Bottom endplate 210 forms a fluid barrier alternate to top endplate 202.

As discussed above, a desorption unit according to an exemplary embodiment of the present invention is constructed using one or more matching pairs of shims. Each shim is designed to be one half of the flow channels that can be found in a typical desorption unit. In other words, a unit is "split" into two halves, that when placed together, form the unit. Shim 206 is illustrative of one shim that can be used in conjunction with another shim. Shim 206 incorporates microscale flow channels that form the basis for the desorption function in a desorption unit. These flow channels can be formed using various processes including etching, grinding, milling, or stamping. Other types of processes to form the microscale channels are considered to be within the scope of the present invention. It should be noted that although shown to be alternating diagonal flow channels, the flow channels of the various sections of a desorber according to the present invention can vary. Exemplary alternative embodiments are described in more detail below.

When a shim, such as shim 206, is joined with its matching shim, a unit is formed. This is illustrated in FIG. 2 by shim assembly 208. Shim assembly 208 comprises one or more pairs (or units) of shims. In one configuration, the flow channels of shim assembly 208 are designed so that the units in shim assembly 208 work in parallel. That is, in a parallel configuration, the fluids going into shim assembly 208 generally enter each shim pair concurrently, and the fluids leaving shim assembly 208 generally exit each shim pair concurrently. In another configuration, the flow channels of shim assembly 208 are designed to provide for serial flow patterns. In such a configuration, the output of one shim unit is an input into another shim unit in shim assembly 208. The present invention can also include various combinations of parallel and countercurrent flow configurations in shim assembly 208 to satisfy the design heat and mass transfer requirements and fluid temperature profiles.

Figure 3:
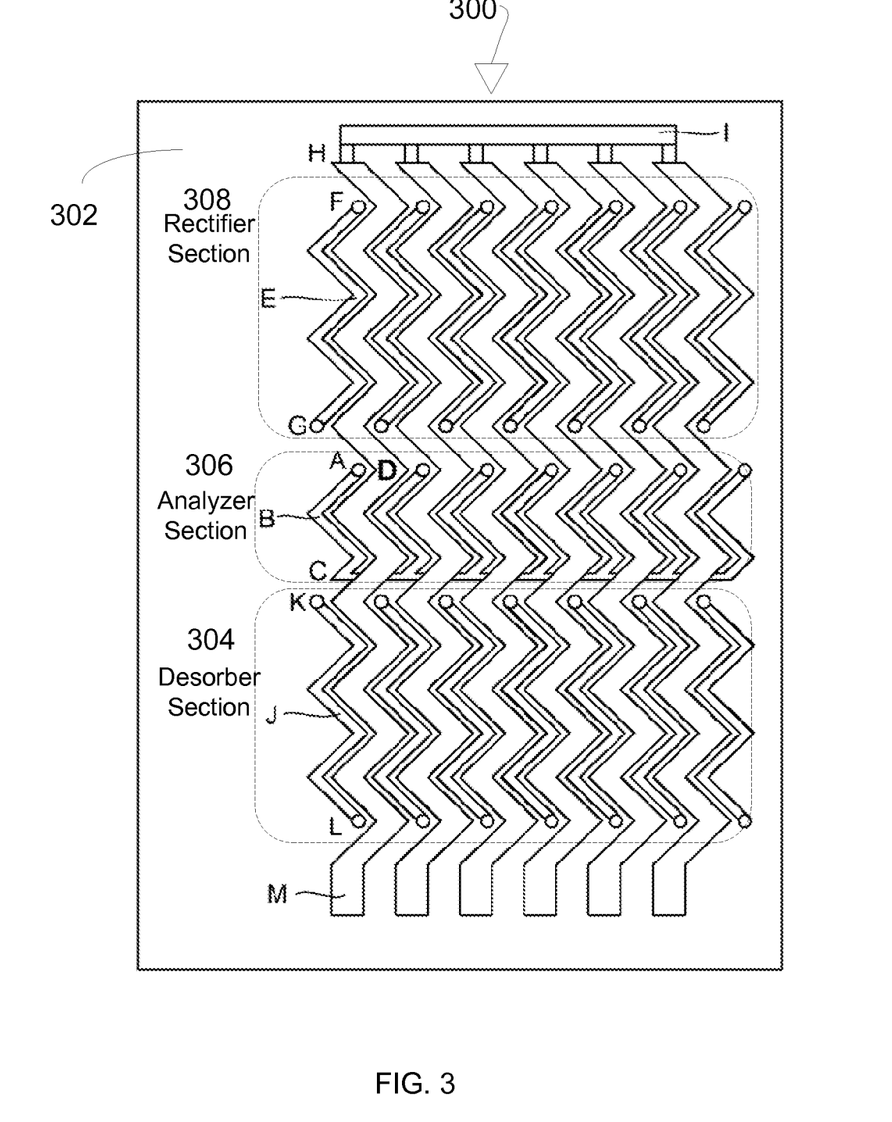
FIG. 3 is an illustration of the flow channels of a desorber/analyzer/rectifier for use in an integrated heat and/or mass exchange device in accordance with an embodiment of the present invention.

FIG. 3 is an illustration of shim 302 forming a desorber-rectifier 300 that can be used in an exemplary embodiment of the present invention. It should be noted that the combination of a desorber and rectifier is by way of example only, as the present invention is not limited to a desorber that requires the use of a rectifier. As discussed above, shim 302 in an exemplary embodiment of the present invention is formed with an alternate shim (not shown) to form a single unit. In desorber section 304 of desorber-rectifier 300, a concentrated solution, such as solution 104 of FIG. 1, enters the desorber-rectifier 300 column D at inlet port C, and flows down the side walls due to gravity. In some exemplary embodiments of the present invention, the concentrated solution can be pre-heated.

The desorber-rectifier 300 heating fluid, such as heating fluid 100 on FIG. 1, enters the shim at header L, flows upward through channel J and exits out of the shim through header K. As the concentrated solution flows down the side walls, heat is transferred to the concentrated solution from the heating fluid. The heat transfer occurring in desorber section 304 causes vaporization of the concentrated solution, producing refrigerant vapor. This refrigerant vapor flows upwards due to buoyancy, creating a counter-flow arrangement between the solution and the refrigerant vapor. The remaining dilute solution is collected in the lower portion of channel M and returned to the absorber through a solution heat exchanger.

The efficiency of desorber-rectifier 300 can be increased through the use of an analyzer section. In one embodiment of the present invention, analyzer section 306 is located between the desorber section 304 and rectifier section 308. Analyzer section 306 can improve system efficiency by allowing additional recuperative heat and mass exchange between the incoming concentrated solution and the rising refrigerant vapor. This direct contact heat and mass exchange serves to preheat the concentrated solution before it enters desorber section 304 and partially purify the rising vapor stream before it enters the rectifier section 308, with no external heat transfer. As with the desorber section 304, in some exemplary embodiments of the present invention, the vapor stream and the incoming concentrated solution are in a countercurrent flow configuration.

The incorporation of the analyzer thus serves to reduce the necessary heating in desorber section 300 and the necessary cooling in rectifier section 308, resulting in increased overall efficiency of the system. The vapor purification accomplished here decreases reflux condensation in the rectifier, and enables higher cooling loads in the evaporator. It should be understood that the present invention benefits from, but does not require the use, of analyzer section 306.

In analyzer section 306, a concentrated solution enters shim 302 at header A, flows downward through the analyzer channel B, and enters the desorber-rectifier 300 column D through port C. As the solution flows down channel B, it is heated by the refrigerant vapor generated in the desorber section 304 flowing upward through column D. The refrigerant vapor on the other hand is cooled, undergoing partial condensation. The condensed reflux solution flows down the side walls of column D due to gravity, while the vapor continues to rise up the column to rectifier section 308. The fresh concentrated solution entering column D at port C flows down the side walls into the desorber section 304.

Although the present invention does not require the use of a rectifier, in some embodiments of the present invention, a rectifier can be used if it is desired to further increase purity. A rectifier is typically used to enrich the concentration of the refrigerant vapor generated in a desorber, such as desorber section 304, by preferentially condensing the absorbent. However, for volatile fluid pairs, some amount of refrigerant is also condensed during this process. An optimized rectifier design can enhance the heat and mass transfer occurring during this process, thus yielding high purity refrigerants that yield larger cooling duties.

In the desorber-rectifier 300, rectifier section 308 downstream of desorber section 304 increases the refrigerant vapor stream concentration further by condensing the excess water vapor from the vapor stream leaving desorber section 304. To provide the cooling required for rectification, a coolant stream is passed through this section, removing heat from the rising vapor and condensing a water-ammonia solution, for example, out of the vapor stream. As in desorber section 304, the rectifier is counter-flow, with the coolant stream and rising vapor flowing in opposing orientations. Additionally, the reflux liquid is also in countercurrent orientation with the refrigerant vapor. This orientation and the corresponding concentration and temperature profiles maximize the heat and mass exchange between the vapor and liquid phases, resulting in increased rectification efficiency.

The refrigerant vapor generated in desorber section 304 rises through column D due to buoyancy, passing analyzer section 306 where it undergoes partial rectification before entering rectification section 308. Coolant (either a hydronic coupling fluid or concentrated ammonia-water solution exiting from the solution pump) enters shim 302 at header F, flows down the coolant channel E, and exits the shim through header G. The refrigerant vapor rising up column D exchanges heat with this coolant, undergoing partial condensation and consequent rectification to the desired concentration.

Figure 4:
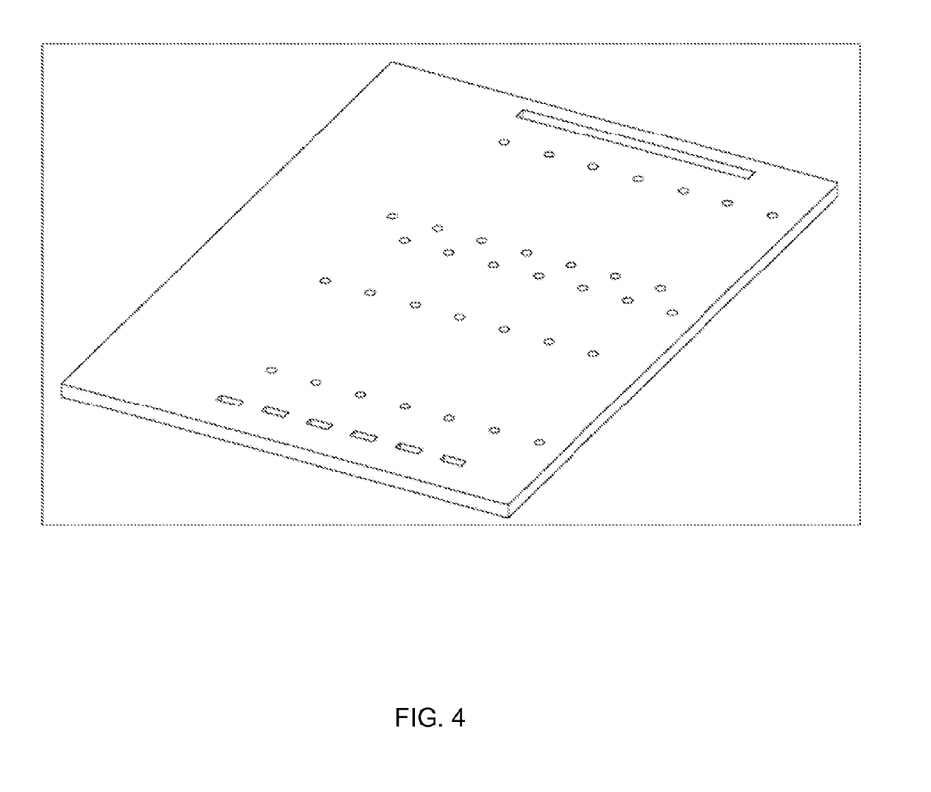
FIG. 4 is an illustration of an exemplary distribution plate of a desorber/rectifier for use in an integrated heat and/or mass exchange device in accordance with an embodiment of the present invention.

Purified refrigerant vapor passes through channel H into header I, where it continues to a condenser (not shown) used in the heat and/or mass exchange system. Reflux formed during the rectification processes flows down the walls of the column D, mixing with the rest of the dilute solution until it is collected at M and returned to the absorber (not shown) used in the heat and/or mass exchange system. FIG. 4 is an illustration of a distribution plate 400 that can be used to port various fluids into and out of a desorber, such as desorber-rectifier 300 of FIG. 3.

Other configurations can be used in conjunction with one or more exemplary embodiments of the present invention. Another embodiment of the present invention utilizes separate shims for both the coupling fluid and working fluid with heat transfer occurring between adjacent shims, rather than through the plane of the shim. This design can prove to be less difficult and less expensive to manufacture for some system designs and for some choices of manufacturing process. Additionally, shims of different thicknesses and different microscale features can be used for the working fluid and coupling fluid, potentially achieving superior material utilization.

Other embodiments of the present invention make use of integrated vapor trap features, which prevent vapor from exiting the component through the liquid ports, and facilitate the counterflow operation of vapor and liquid streams in these compact enclosures. These features are typically integrated into the lower section of the desorber section 304 (though they can be placed elsewhere) and use a relatively short liquid column to seal the liquid outlet port from a vapor stream. Ports can also be added to the component to allow sensor installation, if necessary, to monitor internal operation. Such sensors include, but are not limited to, pH meters, temperature probes or thermocouples, flow meters, pressure transducers, and others.

Figure 5A:
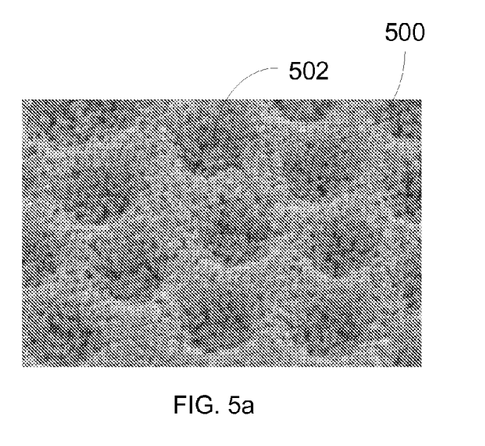
FIGS. 5a-5c are micrographs of exemplary surface treatments that can be used for one or more flow passages in accordance with an embodiment of the present invention.
Figure 5B:
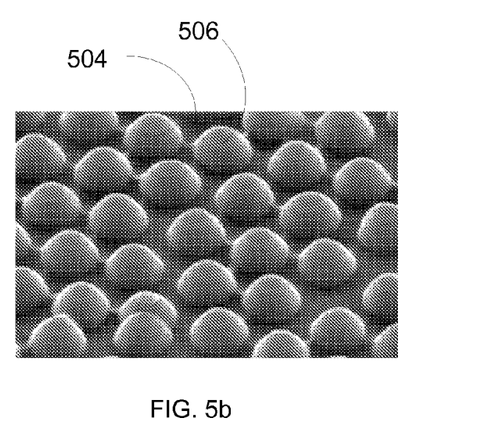
Figure 5C:
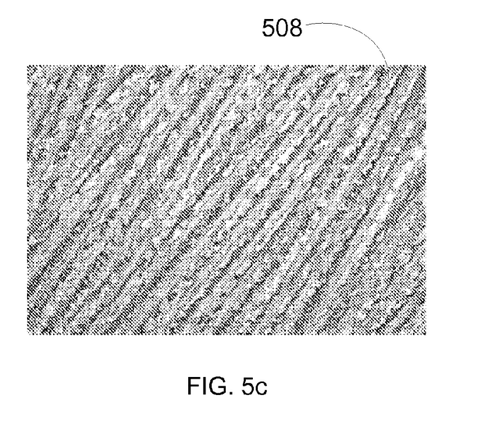

In some embodiments, it is possible to increase active heat and/or mass transfer area, promote mixing of fluid streams within the component, and to provide favorable fluid flow patterns. For example, the surfaces of the various components of a shim can be altered to increase the efficiency or effectiveness of the heat and/or mass transfer. FIGS. 5a-5c illustrate some exemplary surface treatments that can be used.

FIG. 5a is an example of a dimpled surface. A dimpled surface has peaks 500 and valleys 502 that form the surface. In a dimpled surface, the peaks 500 are the base of the surface with the valleys 502 being etched into the surface. As shown in FIG. 5b, a surface 504 can be formed of a plurality of elevated points or rises 506. In another exemplary surface treatment shown in FIG. 5c, the surface treatment incorporates a hatch pattern 508. The hatch pattern 508 can be further altered to be a cross hatch pattern. Various types of treatments can be used to form the surfaces illustrated in FIGS. 5a-5c as can other surfaces be used. For example, the surface can be generally roughened or treated. These and other types of surface treatments can provide for various benefits including, but not limited to, the promotion of wetting of the component walls, the promotion of favorable flow regimes and flow distribution, altering the direction of fluid flow, or the collection of liquid or vapor streams where necessary, such as channeling excess liquid flow into well-formed rivulets to expose wall area or to expedite fluid removal from the component.

Although the present invention has been illustrated using angular flow channels, it is not limited to any particular design of flow channel. Various types of flow channel geometries can be utilized in the fluid channels within the desorber assembly. For example, vertical or diagonally oriented columns can be used to promote the formation of falling or thin films, trays or pools can be used to form areas in which pool boiling processes can occur, and serpentine-type channels can be used to increase surface area and residence time for the fluid streams. Other designs can include the use of fin arrays or packing (such as Raschig rings) within the fluid channels, which again promote fluid mixing and increase heat and mass transfer area.

Figure 6:
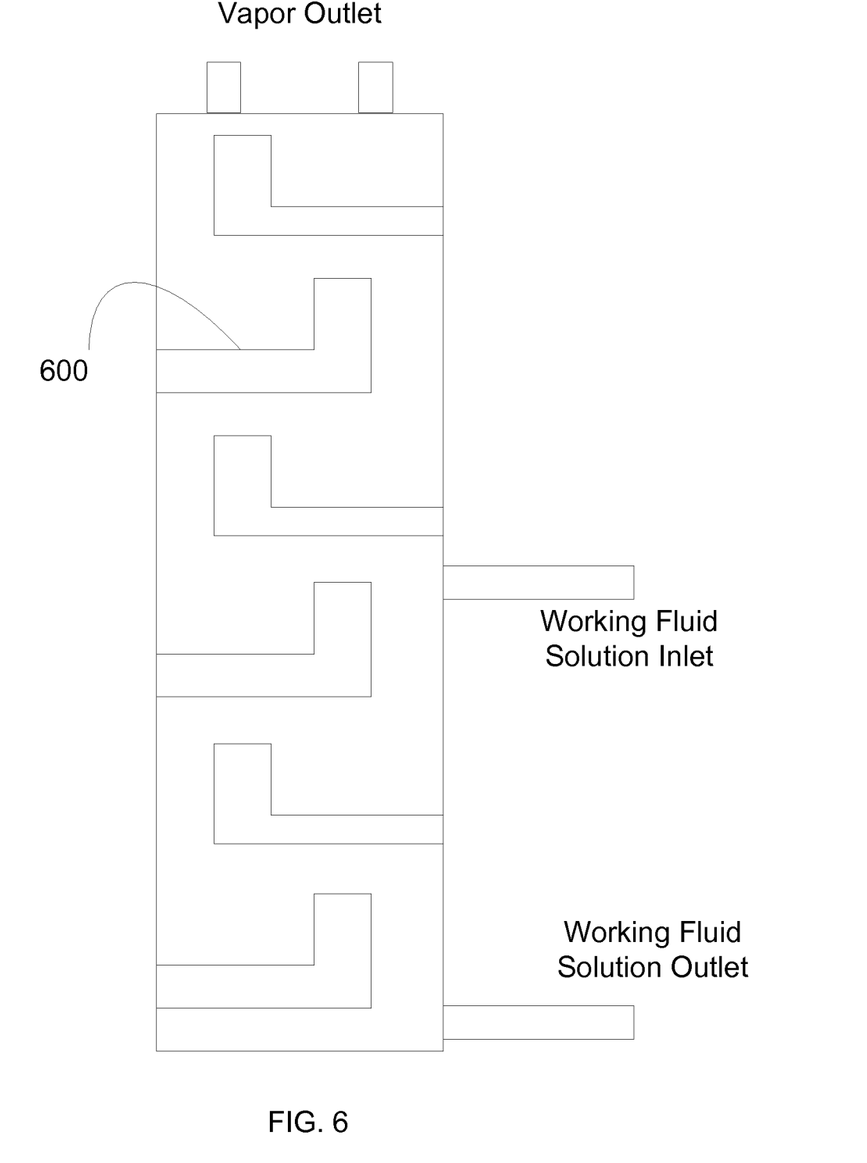
FIG. 6 is a front view illustration of an alternate embodiment of a heat and/or mass exchange device that utilizes a serpentine vapor flow path and a series of liquid trays or pools.

FIG. 6 is a front view illustration of an alternate heat and/or mass exchanger utilizing this same countercurrent design. This embodiment uses a serpentine flow path with liquid trays 600 or pools that promote pool boiling processes in the case of a heated component, or contain condensate in the case of a cooled component. In either case, the pools or trays provide contact area for heat and/or mass transfer between the vapor and liquid streams, which flow countercurrent to one another. Variations on this concept can include changes to the tray dimensions and tray pitch, matching the serpentine channel area to match the vapor flow rate, or other variations in dimensions that allow for desired flow conditions or phenomena. Additionally, the number of trays and/or serpentine paths can be modified to alter the capacity and flow characteristics of the fluids. This design can also incorporate analyzer or rectifier sections. These sections can contain various small- or micro-scale features to aid in the heat/mass transfer processes. For example, various fin arrays or other surface treatments described above can be utilized. Vapor and liquid inlet and outlet locations can vary from those shown to allow for the use of integrated desorber, rectifier and analyzer sections, or to otherwise allow for modifications to the flow paths.

Figure 7:
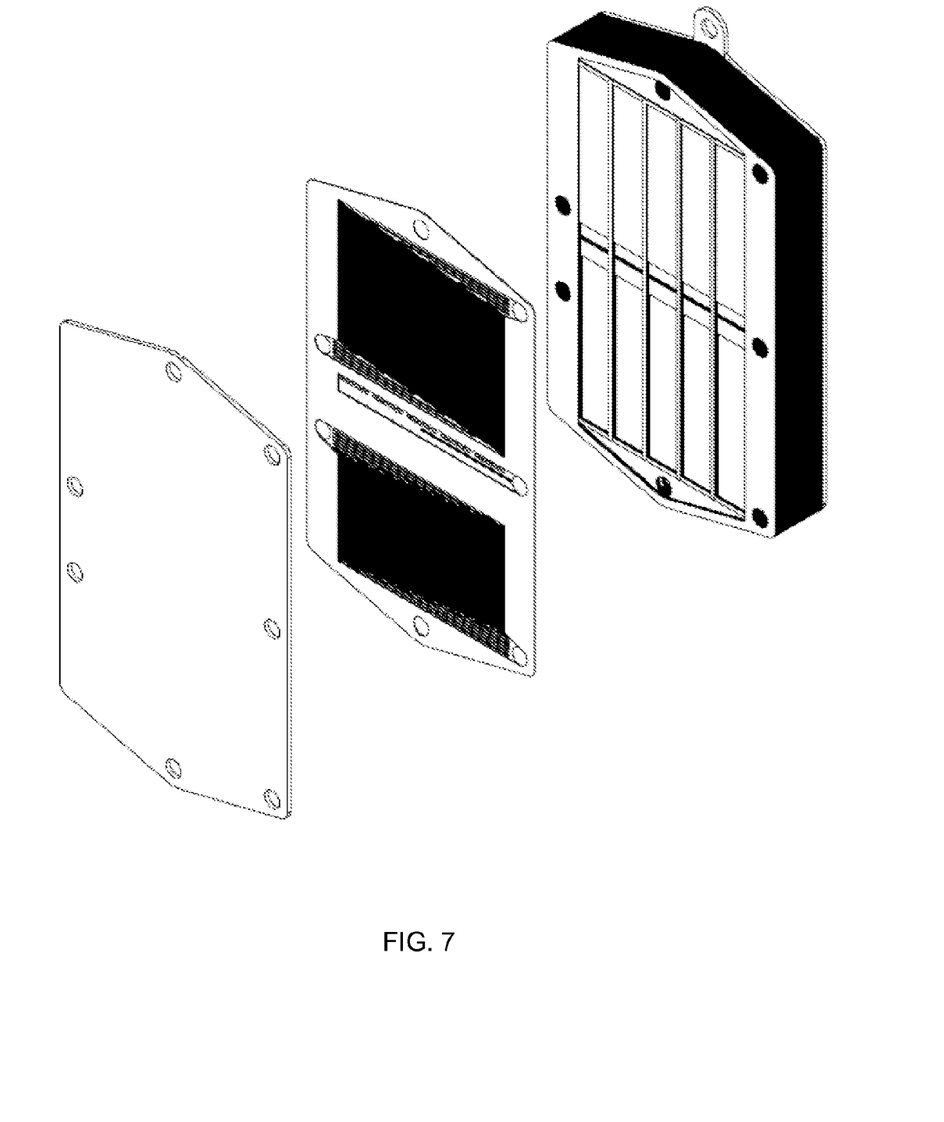
FIG. 7 is an angular view illustration showing a shim of a desorber/analyzer/rectifier for use in an integrated heat and/or mass exchange device in accordance with an embodiment of the present invention.

FIG. 7 is an angular view of an alternate design of the present invention using vertical columns to contain the vapor and solution streams, while the coupling fluids flow through microchannels on adjacent shims. In various embodiments, the vapor stream flows upwards through the vertical columns, while the solution flows downward countercurrent to the vapor. In this embodiment, the walls of the columns can be treated to incorporate various surfaces to promote heat/mass transfer and beneficial fluid flow phenomena.

Figure 8A:
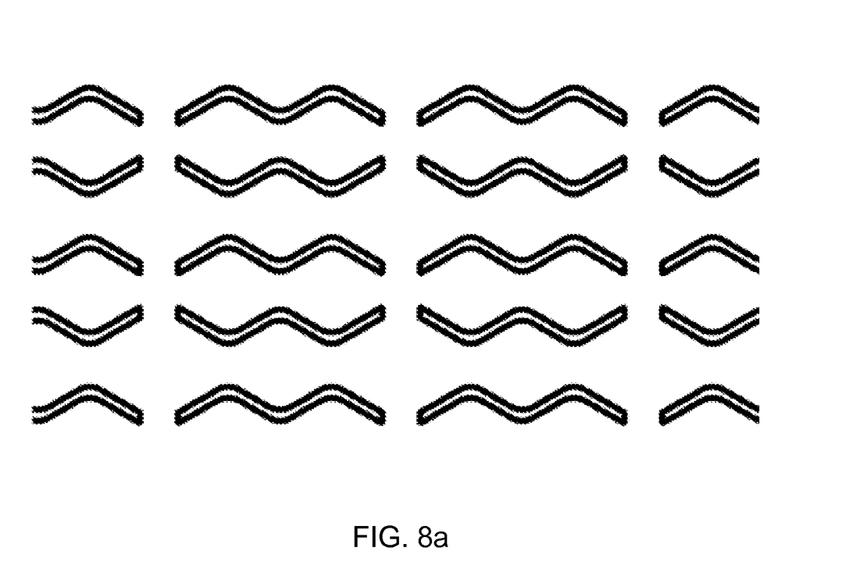
FIGS. 8a and 8b illustrate two surface treatments that can be used in accordance with an embodiment of the present invention.

FIGS. 8a and 8b illustrate two surface treatments that can be used in the vertical column embodiment or other similar embodiments. FIG. 8a depicts an etched surface treatment composed of diagonal, wavy channels, which can be used in the vertical column or other similar designs. The geometry shown is designed to promote formation of liquid rivulets, which aid in the removal of condensate from cooled sections of a heat/mass exchange device. This process can also aid in vapor heat transfer by exposing the vapor stream to non-wetted heat transfer area at the column wall. Various geometric designs can be used to alter fluid flow and promote heat and mass exchange.

Figure 8B:
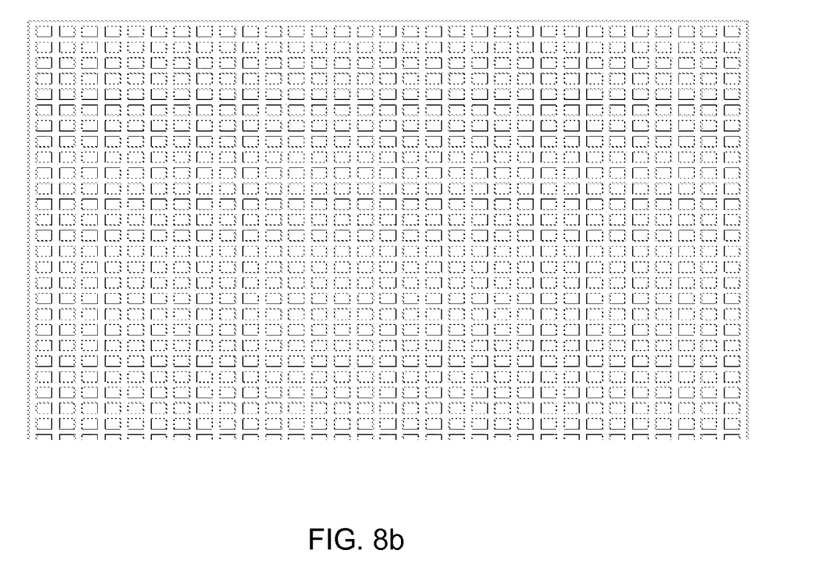

FIG. 8b depicts another surface treatment composed of a hatched array of etched channels. This geometry is designed to promote full wetting of the column walls in sections of the heat/mass exchanger where increased contact of the solution with the wall surface area is critical to improving performance and reducing size. Various other similar geometries can be used to achieve equivalent results.

While the present disclosure has been described in connection with a plurality of exemplary embodiments, as illustrated in the various figures and discussed above, it is understood that other similar embodiments can be used or modifications and additions can be made to the described embodiments for performing similar functions of the present invention without deviating therefrom. Therefore, the present invention should not be limited to any single embodiment, but rather construed in breadth and scope in accordance with the following claims.

What is claimed is:

1. An exchange device for use in an integrated heat and mass transfer apparatus, the exchange device comprising:
   a top end plate with a plurality of ports for inputting a coupling fluid and a working fluid solution into the exchange, wherein the working fluid solution comprises an absorbent and a refrigerant, wherein the top end plate is configured to output the coupling fluid, the working fluid solution, and a vapor of the refrigerant out of the exchange device;
   a distribution plate for distributing the coupling fluid and the working fluid solution into the exchange device and distributing the coupling fluid, working fluid solution and the vapor of the refrigerant out of the exchange device;
   a transfer section formed by a first unit of matched and joined shims, the transfer section having at least one heat exchange region defined by a plurality of rows of compact flow passages with microscale features formed by the matched and joined shims of the first unit;
   wherein the plurality of rows of compact flow passages includes a plurality of desorber-rectifier columns, a plurality of coolant channels, and a plurality of heating channels;
   wherein the plurality desorber-rectifier columns generate a countercurrent flow pattern between the coupling fluid and the working fluid solution when the coupling fluid and the working fluid solution are introduced into the exchange device;

wherein the exchange device is oriented such that the coupling fluid travels in a generally upward direction within the plurality of desorber-rectifier columns, and the working fluid solution travels in a generally downward direction with gravitational assistance within the plurality of desorber-rectifier columns; and wherein the countercurrent flow pattern creates a heat transfer relationship between a vapor of the refrigerant and the working fluid solution;

a bottom endplate that provides a fluid barrier;

wherein the heat transfer relationship generates desorption of the refrigerant from the working fluid solution and absorption of the refrigerant into the working fluid solution; and wherein the heat transfer between the working fluid solution and the vapor of the refrigerant is achieved through an angular geometry of the plurality of desorber-rectifier columns without leading to flooding or flow reversal of the working fluid solution by the vapor of the refrigerant desorbed from or absorbed into the working fluid solution.

2. The exchange device of claim 1, wherein the device is a heat exchanger.

3. The exchange device of claim 1, wherein the device is a mass exchange device.

4. The exchange device of claim 1, wherein the device is a combined heat and mass exchange device.

5. The exchange device of claim 1, wherein the refrigerant is ammonia and the absorbent is water.

6. The exchange device of claim 1, wherein the transfer section is further formed by a plurality of second units of matched and joined shims.

7. The device of claim 1, further comprising a rectifier section that purifies the vapor.

8. A desorber for use in an integrated heat and mass transfer apparatus, the desorber comprising:

a top end plate with a plurality of ports for inputting a heating fluid and a concentrated solution into the desorber, wherein the concentrated solution comprises an absorbent and a refrigerant, wherein the top end plate is configured to output the heating fluid, the concentrated solution, and a vapor of the refrigerant out of the desorber;

a distribution plate for distributing the heating fluid and the concentrated solution into the desorber and distributing the heating fluid, concentrated solution and the vapor of the refrigerant out of the desorber;

a desorber section formed by a first unit of matched and joined shims, the desorber section having at least one heat exchange region defined by a plurality of rows of flow passages with microscale features formed by the matched and joined shims of the first unit;

wherein the plurality of rows of flow passages includes a plurality of desorber-rectifier columns, a plurality of coolant channels, and a plurality of heating channels;

wherein the plurality of desorber-rectifier columns generate a countercurrent flow pattern between the heating fluid and the concentrated solution;

wherein the desorber is oriented such that the heating fluid travels in a generally upward direction and the concentrated solution travels in a generally downward direction with gravitational assistance;

wherein the countercurrent flow pattern creates a heat transfer relationship between the vapor of the refrigerant and the concentrated solution to desorb the vapor of the refrigerant from at least a portion of the concentrated solution;

a bottom endplate that provides a fluid barrier; and wherein the heat transfer between the concentrated solution and the vapor of the refrigerant is achieved through an angular geometry of the plurality of desorber-rectifier columns without leading to flooding or flow reversal of the concentrated solution by the vapor of the refrigerant desorbed from or absorbed into the concentrated solution.

9. The desorber of claim 8, wherein the refrigerant is ammonia and the absorbent is water.

10. The desorber of claim 8, wherein the desorber section is further formed by a plurality of second units of matched and joined shims.

11. The desorber of claim 8, further comprising a rectifier section that purifies the vapor of the refrigerant through heat exchange with a coolant to reduce the temperature of at least a portion of the vapor of the refrigerant.

12. The desorber of claim 11, wherein the coolant is a hydronic coupling fluid or concentrated ammonia-water solution.

13. The desorber of claim 8, further comprising an analyzer section for recuperative heat and mass exchange between the concentrated solution and the vapor of the refrigerant to preheat the concentrated solution and to partially purify the vapor of the refrigerant prior to their introduction into the desorber section.

14. A method of heat and/or mass exchange, the method comprising:

inputting, through a plurality of ports in a to end plate, a coupling fluid into a transfer section formed by a first unit of matched and joined shims, the transfer section having at least one heat exchange region defined by a plurality of rows of flow passages with microscale features formed by the matched and joined shims of the first unit;

distributing, through a distribution plate, the coupling fluid and a working fluid solution into the transfer section;

the working fluid comprising an absorbent and a refrigerant; and distributing, through the distribution plate, the coupling fluid, the working fluid, and a vapor of the refrigerant out of the transfer section;

providing a bottom endplate to provide a fluid barrier;

wherein the plurality of rows of compact flow passages includes a plurality of desorber-rectifier columns, a plurality of coolant channels, and a plurality of heating channels;

facilitating a countercurrent flow pattern relationship between the coupling fluid and the working fluid solution within the plurality of desorber-rectifier columns;

inputting the working fluid solution into the transfer section, wherein the plurality of desorber-rectifier columns facilitate the countercurrent flow pattern between the coupling fluid and the working fluid solution;

generating, via the countercurrent flow pattern, desorption of the refrigerant from the working fluid solution and absorption of the refrigeration into the working fluid solution;

facilitating the flow pattern with an angular geometry that prevents flooding or flow reversal; and transferring a component of the working fluid solution in the transfer section.

15. The method of claim 14, wherein transferring the component in the transfer section comprises desorbing the vapor of the refrigerant from at least a portion of the working fluid solution.

16. The method of claim 15, further comprising rectifying the vapor of the refrigerant.

17. The method of claim 14, wherein transferring the component in the transfer section comprises absorbing the vapor of the refrigerant into at least a portion of the working fluid solution.

18. The method of claim 14, further comprising joining a plurality of second units to the first unit.

* * * * *